(12) United States Patent
Liu et al.

(10) Patent No.: US 7,226,650 B2
(45) Date of Patent: Jun. 5, 2007

(54) WRAPPED HIGHLY VISCOUS CHEMICAL ANCHORING ADHESIVE

(75) Inventors: Wen-Feng Liu, Naperville, IL (US); Eldridge Presnell, Round Lake Beach, IL (US); James E. Surjan, St. Charles, IL (US)

(73) Assignee: Illinois Tool Works Inc., Glenview, IL (US)

( * ) Notice: Subject to any disclaimer, the term of this patent is extended or adjusted under 35 U.S.C. 154(b) by 275 days.

(21) Appl. No.: 10/882,654

(22) Filed: Jul. 1, 2004

(65) Prior Publication Data

US 2006/0003128 A1     Jan. 5, 2006

(51) Int. Cl.
*B32B 1/08*     (2006.01)

(52) U.S. Cl. .................. 428/36.9; 206/219; 229/87.01; 405/259.5; 405/259.6; 428/34.1; 428/35.2; 428/36.91

(58) Field of Classification Search ............... 428/36.9, 428/36.91, 34.1, 35.2, 458, 500; 206/219; 405/259.6, 259.5; 229/87.01
See application file for complete search history.

(56) References Cited

U.S. PATENT DOCUMENTS

| | | | |
|---|---|---|---|
| 3,385,427 A | 5/1968 | Stouls | |
| 3,494,990 A | 2/1970 | Balint | |
| 3,708,379 A | 1/1973 | Flint | |
| 3,781,965 A | 1/1974 | Bone | |
| 3,837,981 A | 9/1974 | Flint | |
| 3,847,279 A | 11/1974 | Montgomery | |
| 3,900,999 A | 8/1975 | Callan | |
| 3,971,117 A | 7/1976 | Osterhout et al. | |
| 4,040,471 A | 8/1977 | McCray et al. | |
| 4,103,771 A | 8/1978 | Klatt et al. | |
| 4,105,114 A | 8/1978 | Knox et al. | |
| 4,250,074 A | 2/1981 | Foscante et al. | |
| 4,286,899 A | 9/1981 | Benichou et al. | |
| 4,340,637 A | 7/1982 | Koob et al. | |
| 4,516,884 A | 5/1985 | Douty | |
| 4,560,902 A | 12/1985 | Kardon | |
| 4,678,374 A | 7/1987 | Calandra, Jr. | |
| 4,759,888 A | 7/1988 | Brest van Kempen | |

(Continued)

FOREIGN PATENT DOCUMENTS

AU     48487/97     6/1998

(Continued)

OTHER PUBLICATIONS

*La nouvella recharge pour chevilles chimiques HVU Hilti: une championne qui sait "encaisser"!*, company brochure (9 pages), Hilti (Suisse) SA, (1996).

(Continued)

*Primary Examiner*—Nasser Ahmad
(74) *Attorney, Agent, or Firm*—Pauley Petersen & Erickson

(57) ABSTRACT

A film wrapper for use in storing slugs and ropes of chemical anchoring adhesive includes an outer metallized polymer layer and a heat seal layer. The metallized polymer layer protects the chemical anchoring adhesive from premature reaction by providing a barrier to oxygen and light. The heat seal layer may also act as a moisture barrier layer. The chemical anchoring adhesive is divided into slugs of appropriate size for insertion into boreholes and cementing of anchor pins in the boreholes.

20 Claims, 2 Drawing Sheets

U.S. PATENT DOCUMENTS

| | | | |
|---|---|---|---|
| 5,027,981 | A | 7/1991 | Magister |
| 5,110,643 | A * | 5/1992 | Akao et al. ............ 428/35.9 |
| 5,129,977 | A | 7/1992 | Leatherman |
| 5,229,438 | A | 7/1993 | Ishida et al. |
| 5,352,308 | A | 10/1994 | Tomihara et al. |
| 5,447,593 | A | 9/1995 | Tanaka et al. |
| 5,480,067 | A | 1/1996 | Sedlmeier |
| 5,486,096 | A | 1/1996 | Hertel et al. |
| 5,544,981 | A | 8/1996 | Nishida et al. |
| 5,554,240 | A | 9/1996 | Toy |
| 5,563,217 | A | 10/1996 | Davis et al. |
| 5,697,524 | A | 12/1997 | Sedlmeier |
| 5,714,216 | A | 2/1998 | Banhardt et al. |
| 5,730,557 | A | 3/1998 | Skupien et al. |
| 5,731,366 | A | 3/1998 | Moench et al. |
| 5,738,939 | A | 4/1998 | Calhoun et al. |
| 5,859,114 | A | 1/1999 | Davis et al. |
| 5,953,879 | A | 9/1999 | Fischer et al. |
| 6,033,153 | A | 3/2000 | Fergusson |
| 6,214,159 | B1 | 4/2001 | Armin |
| 6,291,555 | B1 | 9/2001 | Surjan et al. |
| 6,402,434 | B1 | 6/2002 | Surjan et al. |
| 6,403,678 | B1 | 6/2002 | Surjan et al. |
| 6,416,256 | B1 | 7/2002 | Surjan et al. |
| 6,420,458 | B1 | 7/2002 | Surjan et al. |

FOREIGN PATENT DOCUMENTS

| | | |
|---|---|---|
| BE | 754232 | 5/1971 |
| BE | 784024 | 4/1972 |
| BE | 815338 | 9/1974 |
| BE | 830102 | 10/1975 |
| BE | 830269 | 10/1975 |
| BE | 840460 | 8/1976 |
| BE | 855086 | 9/1977 |
| DE | 2012908 | 4/1971 |
| DE | 1603819 | 8/1975 |
| DE | 2423410 | 11/1975 |
| DE | 2925508 | 1/1981 |
| DE | 34 11 253 A1 | 10/1984 |
| DE | 3518277 | 4/1986 |
| DE | 4136145 | 5/1993 |
| DE | 4141990 | 6/1993 |
| DE | 29610947 | 8/1996 |
| DE | 197 34 302 | 2/1999 |
| DE | 197 36 850 | 2/1999 |
| DE | 197 39 764 | 3/1999 |
| EP | 144039 | 6/1985 |
| EP | 849 345 | 6/1998 |
| EP | 8493415 | 6/1998 |
| FR | 1593972 | 4/1970 |
| FR | 2051848 | 2/1971 |
| FR | 2073549 | 1/1972 |
| FR | 2 792 292 A | 10/2000 |
| GB | 1344741 | 1/1974 |
| GB | 1346674 | 2/1974 |
| GB | 1381276 | 1/1975 |
| GB | 2 080 906 A | 2/1982 |
| GB | 2241759 | 9/1991 |
| GB | 2 289 737 A | 11/1995 |
| JP | 55165398 A2 | 12/1980 |
| WO | 98/55772 | 12/1998 |

OTHER PUBLICATIONS

*Technical Guide Supplement HILTI HVA Adhesive Anchoring System* (11 pages), Hilti, Inc., 1997.
*Shell Resins*, EPON® RESIN 828 specification sheet, Shell Oil Co., undated.
*Epoxy Curing Agents and Diluents*, ANCAMINE® 1856 Curing Agent specification sheet, Air Products and Chemicals, Inc., undated.
*Epoxy Curing Agents and Modifiers*, ANCAMINE® K54 Curing Agent specification sheet, Air Products and Chemicals, Inc., Feb. 1998.
*Epoxy Curing Agents*, ANCAMINE® 1767 Curing Agent specification sheet, Air Products and Chemicals, Inc., Nov. 1997.
*Epoxy Curing Agents*, specification sheets (5 pages), Air Products and Chemicals, Inc., undated.
*Acceptance Criteria For Adhesive Anchors In Concrete And Masonry Elements*, International Conference of Building Officials, 1-11, Jan. 1999.
*Iron and Steel*, Textbook, Section 6, pp. 17-30, undated.
*Condensed Chemical Dictionary*, Van Nostrand Reinhold Co. p. 844, 1971.

\* cited by examiner

WRAPPED HIGHLY VISCOUS CHEMICAL ANCHORING ADHESIVE

FIELD OF THE INVENTION

This invention is directed to a wrapped highly viscous chemical anchoring adhesive useful in industrial and commercial applications such as bridges, airports, highways, skyscrapers, stadiums and tunnels. The wrapper improves the shelf life of the adhesive without adversely affecting its performance.

BACKGROUND OF THE INVENTION

High viscosity chemical anchoring adhesives are disclosed in U.S. Pat. Nos. 6,291,555; 6,402,434; 6,403,678, 6,416,256 and 6,420,458. The chemical anchoring adhesive can be formed to a desired shape and/or cut to a desired length, before being sent to the job site or at the job site. Because of its high viscosity, the chemical anchoring adhesive can be injected into a borehole which is upside down and vertical, or horizontal, or oriented at any angle, and will not spill or flow out of the borehole.

Because of its high viscosity, the chemical anchoring adhesive need not be stored in a wrapper or container for effective use. However, each of the above patents discloses the optional use of a wrapper made of plastic, aluminum, foil, paper or the like. The wrapper may improve the aesthetic appearance and stability of the adhesive during storage. The wrapper typically shreds when the adhesive is applied to a borehole, and mixes with the adhesive, due to action of the driving tool. Depending on the wrapper composition and thickness, mixing of the wrapper with the adhesive may adversely affect the adhesive performance.

SUMMARY OF THE INVENTION

The present invention is directed to a tubular wrapper for a chemical anchoring adhesive which provides improved shelf life without adversely affecting adhesive performance, and a combination including the wrapper and a chemical anchoring adhesive. The wrapper includes a structural gas barrier layer which inhibits the release of volatile organic components, a liquid barrier layer, and a heat seal layer. The liquid barrier layer may serve as the heat seal layer, eliminating the need for a separate heat seal layer. The layers may be combined together, and the resulting film formed into a wrapper. The wrapper can be applied to a rope or slug of chemical anchoring adhesive.

DETAILED DESCRIPTION OF THE PRESENTLY PREFERRED EMBODIMENTS

In accordance with the invention, a wrapper for a chemical anchoring adhesive includes a structural gas barrier layer, a water barrier layer, and a heat seal layer; or a structural gas barrier layer and a combination water barrier/heat seal layer. The structural gas barrier layer may be formed of a polyamide such as nylon 6, nylon 11, nylon 12, nylon 6/6, nylon 6/10, nylon 6/12 or the like; combined with metal (herein a "metallized polyamide"). Other metallized polymers, such as metallized polyester or metallized polypropylene, may alternatively be used. The liquid barrier layer may be a polyolefin such as polyethylene, polypropylene, a copolymer of ethylene with up to 15% by weight of a $C_3$–$C_{20}$ alpha-olefin comonomer, or a copolymer of propylene with up to 15% by weight of a $C_2$ or $C_4$–$C_{20}$ alpha-olefin comonomer.

Suitably, the liquid barrier layer is linear low density polyethylene, which is a random copolymer of ethylene with up to 15% by weight of a $C_3$–$C_{20}$ alpha-olefin comonomer, formed using a low pressure process. One advantage of using linear low density polyethylene as the liquid barrier layer, is that it may also serve as the heat seal layer. In this embodiment, the film wrapper need only include two layers.

When an additional heat seal layer is employed, the heat seal layer may be formed of linear low density polyethylene, ethylene vinyl acetate, ethylene methyl acrylate, ethylene ethyl acrylate, ethylene acrylic acid, or the like. In this embodiment, the film wrapper includes at least three layers.

The wrapper film may be formed by extruding the film as a continuous tube using a parison or small blown film die, for instance, and cutting the tube into tubular film segments. A slug of chemical anchoring adhesive may then be inserted into each tube segment, and the tube segment sealed at both ends. Alternatively, the film may be formed as a flat film using cast or blown film coextrusion, extrusion coating, thermal lamination or the like, and cut into segments. The film segments can be formed into tubular film segments by wrapping each film segment around a segment of chemical anchoring adhesive, and sealing the film segment at both ends. Alternatively, a flat film can be formed and wrapped around a long or continuous rope of chemical anchoring adhesive to form a long or continuous tubular film wrapper. The resulting combination of tubular film and chemical anchoring adhesive can then be cut into segments. Alternatively, a plurality of slugs of chemical anchoring adhesive may be formed and placed into a pouch formed of the wrapper film. In this embodiment, the wrapper film need not be in the form of a tube.

Figure 1:
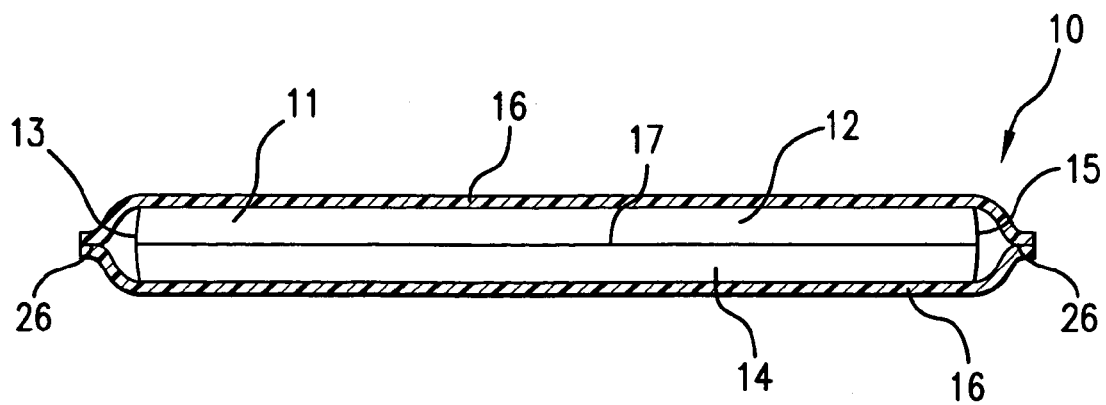
FIG. 1 illustrates an adhesive slug wrapped with a tubular film according to the invention.

FIG. 1 is an elongated sectional view of a combination 10 including a slug 11 of chemical anchoring adhesive inside a tubular wrapper film 16. The slug 11 of chemical anchoring adhesive includes a first part 12 and a second part 14 joined along an interface 17, and has a first end 13 and a second end 15. The tubular wrapper film 16 is heat sealed at both ends 13 and 15 of adhesive slug 11, forming heat seal junctions 26 which enclose both ends of the slug 11.

Figure 2:
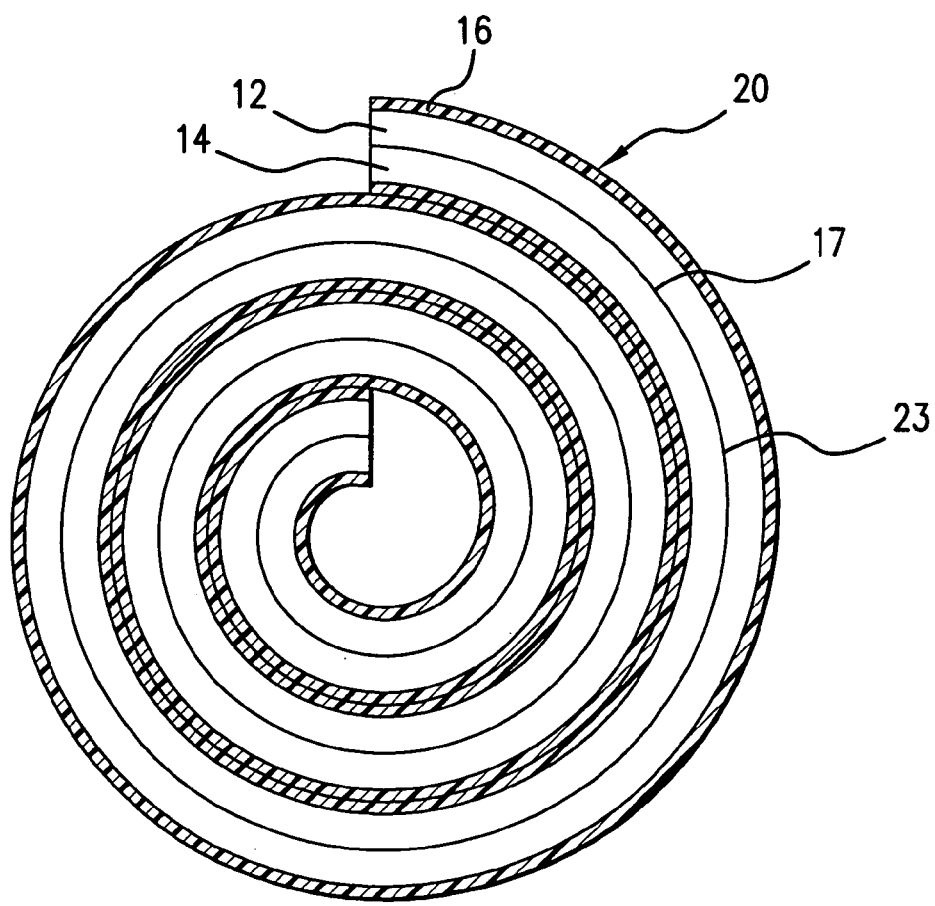
FIG. 2 illustrates an adhesive rope wrapped with a tubular film according to the invention.

FIG. 2 is an elongated sectional view of a combination 20 including a rope 23 of chemical anchoring adhesive inside a long tubular film 16. The rope 23 of chemical anchoring adhesive includes a first part 12 and a second part 14 joined along an interface 17. During use, the combination 20 can be cut into individual segments corresponding to the sizes of a borehole and anchor pin to be installed. The individual segments may resemble the combination 10 shown in FIG. 1, except that cutting of the combination 20 will not result in heat sealing of film 16 at both ends of the resulting segments. The absence of heat sealing should not present a problem if the segments are promptly used after being cut.

Figure 3:
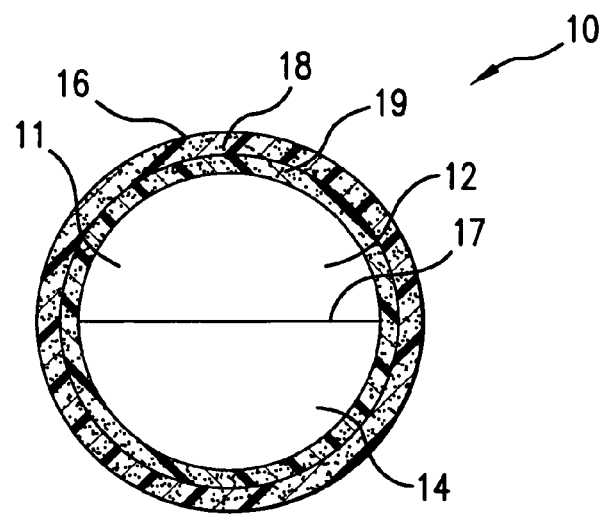
FIGS. 3 and 4 illustrate cross-sections of tubular films combined with an adhesive slug.
Figure 4:
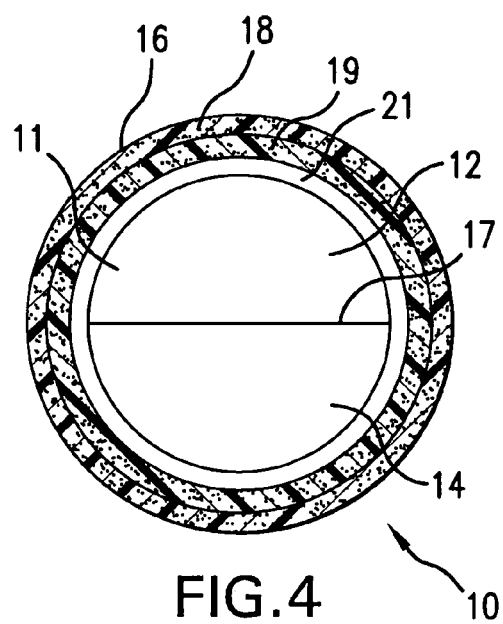

FIGS. 3 and 4 illustrate cross-sectional views of combination 10 showing the cylindrical cross-section of tubular film 16. In the embodiment of FIG. 3, the tubular film 16 includes a first (outer) layer 18 and a second (inner) layer 19. In the embodiment of FIG. 4, the tubular film 16 includes a first (outer) layer 18, a second (middle) layer 19, and a third (inner) layer 21.

Figure 5:
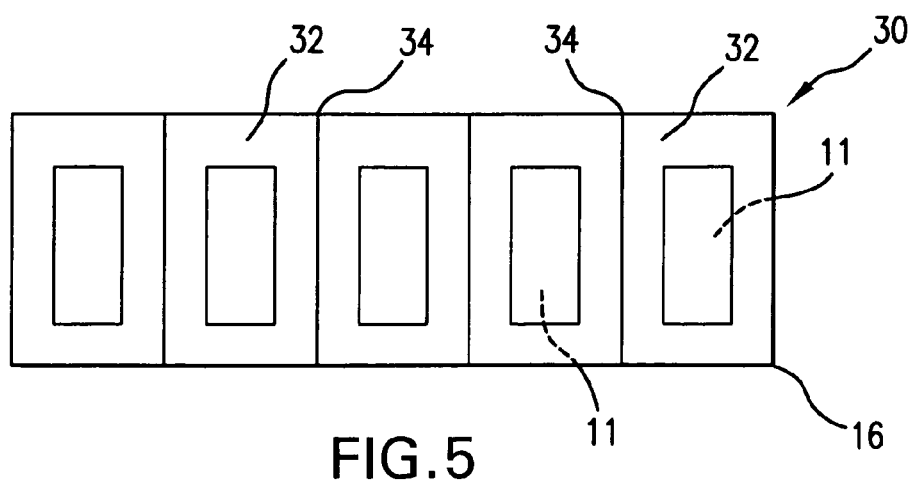
FIG. 5 illustrates a package 30 formed of the film wrapper of the invention, and containing several adhesive slugs.

FIG. 5 illustrates a combination 30 including a film wrapper 16 of the invention divided into several pouches 32, each separated by a barrier 34. An individual adhesive slug 11 is placed within each pouch 32. In this embodiment, the film wrapper 16 is not formed into a tube.

The first (outer) layer 18 of wrapper film 16 provides a barrier to oxygen and light, and is suitably formed of a metallized polymer, which is a combination of metal particles and thermoplastic polymer. The polymer can be a polyamide such as nylon 6, nylon 11, nylon 12, nylon 6/6, nylon 6/10, nylon 6/12 or the like, and is suitably nylon 6. The polyamide can also be a copolymer, such as polyether amide. The metal particles can be particles of aluminum, copper, zinc, cobalt, nickel, iron, silicon, titanium or the like, as well as oxides of these metals. The metal particles are suitably aluminum. The metal particles may have an average particle diameter of about 0.1–25 microns, suitably about 0.5–15 microns, particularly about 1–10 microns. The metal particles may be blended with the polyamide or deposited on a polyamide film surface using a conventional metal deposition/coating technique.

The first film layer 18 may include about 50–99.9% by weight polymer and about 0.1–50% by weight metal particles, suitably about 75–99.5% by weight polymer and about 0.5–25% by weight metal particles, particularly about 95–99% by weight polymer and about 1–5% by weight metal particles. The first film layer 18 may have a thickness of about 2–30 microns, suitably about 5–25 microns, particularly about 10–20 microns.

The second film layer 19 can be formed of a polyolefin. Suitable polyolefins include without limitation high density polyethylene, low density polyethylene, linear low density polyethylene and other copolymers of ethylene with about 1–15% by weight $C_3$–$C_{20}$ alpha-olefin comonomers, polypropylene, copolymers of propylene with about 1–15% by weight ethylene or a $C_4$–$C_{20}$ alpha olefin comonomer, and combinations thereof. The polyolefin can be made using a Ziegler-Natta catalyst, a single-site (e.g., metallocene) catalyst, or another suitable catalyst. A particularly suitable polyolefin is linear low density polyethylene, such as a random copolymer of ethylene-butene, ethylene-hexene or ethylene-octene.

The polyolefin can have a melt index (measured at 190° C. using a 2160-gram weight) or melt flow rate (measured at 230° C. using a 2160-gram weight) suitable for film forming. When the polyolefin is polyethylene or an ethylene-alpha olefin copolymer, its melt index may be about 0.5–25 grams/10 min., suitably about 1–10 grams/10 min. When the polyolefin is polypropylene or a propylene-ethylene copolymer, its melt flow rate may be about 1–25 grams/10 min., suitably about 2–15 grams/10 min. The second film layer 19 may have a thickness of about 3–30 microns, suitably about 10–25 microns, particularly about 14–20 microns.

When the second film layer 19 is formed of linear low density polyethylene, the second layer 19 may serve both as a moisture barrier layer and a heat seal layer. A commercially available two-layer film, suitable for use in forming the film wrapper 16, can be obtained from Glenroy, Inc. The two-layer film includes a first layer of metallized nylon 6 (made using aluminum particles) having a thickness of 12.2 microns. The first layer is obtained from Honeywell, Inc. under the trade name CAPRAN EMBLEM MT-200. The commercial film includes a second layer of linear low density polyethylene having a thickness of 16.5 microns.

When a heat seal layer is included as a third film layer 21, the layer 21 may be formed of any heat sealable polymer, including without limitation linear low density polyethylene, ethylene vinyl acetate, ethylene methyl acrylate, ethylene ethyl acrylate, ethylene acrylic acid, various thermoplastic elastomers, and combinations thereof. When present, the third (inner) film layer may have a thickness of about 2–25 microns, suitably about 5–20 microns.

The film wrapper 16 may have a cylindrical cross-section as shown in FIGS. 3 and 4. Depending on the size of the adhesive slug 11 or rope 23 being packaged, the tubular film 16 may have an internal diameter of about 5–50 mm, suitably about 10–25 mm.

The film wrapper 16 may also be shaped as a multi-pack having a plurality of pouches 32 as shown in FIG. 5. The pouches 32 may be separated by a barrier 34, which can be a heat seal barrier or a separate barrier film. Adhesive slugs 11 are formed, sized and placed into the pouches 32.

The film wrapper 16 may be used to package any of the high viscosity chemical anchoring adhesives described in U.S. Pat. Nos. 6,291,155; 6,402,434; 6,403,768; 6,416,256; and 6,420,458, which are incorporated by reference. Generally, these anchoring adhesives have a first part A and a second part B joined along an interface. The first part A and second part B may each have a viscosity of about 5 million to about 50 million centipoise. The parts A and B are essentially solid or putty-like, and do not mix with each other or react until mixing is forced by action of a driving tool in a borehole. Mixing of parts A and B results in a curing reaction which causes firm bonding between an anchor pin and one or more inside walls of a borehole. The driving tool includes a rapidly rotating driving member which shreds the wrapper (when present) and causes the wrapper to mix with parts A and B of the chemical anchoring adhesive.

The film wrapper 16 may also be used to package slugs and/or ropes of lower viscosity adhesive whose viscosities are nevertheless high enough to cause the adhesive to have a relatively stable, putty-like consistency. Referring to FIGS. 1–4, the adhesive slug or rope may include a first part 12 having a viscosity of about 200,000–4,000,000 centipoise, suitably about 500,000–1,000,000 centipoise; and a second part 14 having a viscosity of about 200,000–4,000,000 centipoise, suitably about 500,000–1,000,000 centipoise, The viscosity is measured at 25° C. using a Brookfield Viscometer, Model DV-3, made by Brookfield Engineering Co. The first part 12 and second part 14 are directly joined along an interface 17, and are viscous enough so that they do not spontaneously mix with each other.

The first part 12 suitably includes at least a resin. In one embodiment, the first part 12 includes at least an epoxy resin and a particulate filler, in proportions needed to achieve the desired viscosity. In another embodiment, the first part 12 includes about 20–49% by weight of an epoxy resin, about 50–80% by weight sand, and about 1–10% by weight fumed silica. Suitably, the first part 12 includes about 28–40% by weight of an epoxy resin, about 55–70% by weight sand, and about 2–6% by weight fumed silica.

The second part 14 includes at least a curing agent. In one embodiment, the second part 14 includes at least a curing compound, a curing accelerator, and a particulate filler, in proportions needed to achieve the desired viscosity. In another embodiment, the second part 14 includes about 5–25% by weight of an amine compound, about 0.1–15% by weight of a tertiary amine compound, about 60–90% by weight sand, and about 1–10% by weight fumed silica. Suitably, the second part 14 includes about 10–20% by weight of an amine compound, about 2–10% by weight of a tertiary amine compound, about 70–80% by weight sand, and about 1–5% by weight fumed silica.

The epoxy resin is suitably a liquid epoxy derivative. Examples include novolac epoxy resins and bisphenol epoxy resins. One suitable bisphenol epoxy resin is available from Shell Chemical Co. under the trade name EPON 828. EPON 828 is a difunctional bisphenol A/epichlorohydrin derived from liquid epoxy. Other suitable epoxy resins include ARALDITE 610, available from Ciba-Geigy, and DER 331, available from Dow Chemical Co.

The particulate filler in the first part may include a blend of a first particulate filler and a second particulate filler. At least about 70% by weight of the first particulate filler has a U.S. Sieve size between 16 and 45, inclusive. A suitable first particulate filler is AGSCO Sand #1, a silica sand sold by the Agsco Company. At least about 70% by weight of the second particulate filler has a U.S. Sieve size between 60 and 100, inclusive. A suitable second particulate filler is Sand 70–100, a silica sand sold by the Agsco Company. The sand in the first part 12 may include about 3–7 parts by weight of the first sand per one part by weight second sand, suitably about 4–5 parts by weight of the first sand per one part by weight of the second sand, based on the combined weight of particulate fillers in the first part 12. The particulate filler in the first part 12 of the adhesive slug 11 may also include fumed silica in an amount of about 0.1–0.8 parts by weight, suitably about 0.3–0.4 parts by weight fumed silica per one part by weight of second sand. A suitable fumed silica is R-202, available from the DeGussa Company.

The particulate filler in the second part 14 of adhesive slug 11 may include the foregoing second particulate filler, at least about 70% by weight of the particulate filler having a U.S. Sieve size of 60–100, inclusive. The particulate filler in the second part may also include fumed silica in an amount of about 1–10 parts by weight, suitably about 2–3 parts by weight fumed silica per 100 parts by weight second particulate filler, based on the combined weight of particulate fillers in the second part 14 of adhesive slug 11.

The curing agent may include a curing compound and a curing accelerator. In one embodiment, the curing compound is an amine compound, defined as meaning an amine or chemical derivative thereof, but not a tertiary amine. Suitable amine compounds include amines, aliphatic amines, aminoethylpiperazine, amido amines, cycloaliphatic amines and the like. Suitable aliphatic amines include Mannich bases. One suitable Mannich base is sold by Air Products Co. under the name ANCAMINE 1856. Other suitable amines include ANCAMINE 1767, ANCAMINE 1768 and ANCAMINE 2422.

The curing accelerator can be a tertiary amine compound. Examples of suitable tertiary amines include ANCAMINE 110, ANCAMINE K61B, and ANCAMINE K54, all sold by Air Products Co., and EPICURE 3253 sold by Shell Chemical Co. ANCAMINE K54 is particularly suitable, and is a tris-(dimethylaminomethyl)phenol.

The following exemplary compositions are suitable for the first part 12 and the second part 14 of the chemical anchoring adhesive 11.

| Material | % By Weight |
| --- | --- |
| First Part (Resin) | |
| EPON 828 (Bisphenol A Epoxy Resin) | 35.00 |
| Agsco Sand 70–100 | 11.00 |
| R-202 (fumed silica) | 4.00 |
| AGSCO Sand #1 | 50.00 |
| Total | 100.00 |

-continued

| Material | % By Weight |
| --- | --- |
| Second Part (Hardener) | |
| ANCAMINE 1856 (modified aliphatic amine) | 14.50 |
| ANCAMINE 2422 (amine) | 3.00 |
| ANCAMINE K54 (tertiary amine) | 5.00 |
| R-202 (fumed silica) | 3.00 |
| Agsco Sand 70–100 | 74.50 |
| Total | 100.00 |

The chemical anchoring adhesive 11 may include about 10–90% by weight of the first part 12 and about 10–90% by weight of the second part 14, suitably about 25–80% by weight of the first part 12 and about 20–75% by weight of the second part 14, particularly about 50–75% by weight of the first part 12 and about 25–50% by weight of the second part 14. In the foregoing example, the adhesive composition may include 13 parts by weight (59% by weight) of the first part 12 and 9 parts by weight (41% by weight) of the second part 14. The exemplified first part 12 has a viscosity of about 880,000 centipoise. The exemplified second part 14 has a viscosity of 569,600 centipoise.

To manufacture the chemical anchoring adhesive 11, the ingredients of the first part 12 can be mixed in a first mixer, and the ingredients of the second part can be mixed in a second mixer. The separate mixers can be drum tumblers, sigma blade mixers, planetary mixers, extrusion mixers, press mixers and the like. Vigorous mixing, involving shear without added heat, may be employed to ensure a homogeneous distribution of ingredients in each of the first and second parts 12 and 14. The first and second parts 12 and 14 may be extruded and/or pressed adjacent to each other, using separate extruders and/or presses that converge in a single die, to form the biconstituent adhesive composition having interface 17 between first and second parts 12 and 14.

The chemical anchoring adhesive may be wrapped with film wrapper 16 using any suitable technique, including the techniques described with respect to FIGS. 3–5. The wrapper 16 may be the only wrapper employed. In an alternative embodiment, the chemical anchoring adhesive may be extruded onto a carrier stretch-wrap film, such as a film made from linear low-density polyethylene, and pre-wrapped in the carrier film. The rope of pre-wrapped chemical anchoring adhesive can then be cut into individual pre-wrapped slugs 11. The pre-wrapped slugs 11 are then further wrapped using the film wrapper 16 according to the invention.

As described in U.S. Pat. No. 6,291,555, which is incorporated by reference, the slugs of chemical anchoring adhesive are applied as follows. A slug 11 is inserted into a borehole and a driving tool is used to drive an anchor pin into the borehole. A typical anchor pin may be threaded, and may have a flat or pointed forward end. A typical driving tool uses rapid rotational motion to spin the anchor pin into the borehole and may employ a combination of hammering (axial motion) with rotational motion.

The movement of the driving tool, and consequent motion of the anchor pin, causes disintegration of the wrapper 16 (if it surrounds the adhesive slug 11), and mixing of the first and second parts 12 and 14 of the adhesive slug 11. The threads on the anchor pin aid in the mixing. As the anchor pin is driven into the borehole, the first part 12, second part 14 and wrapper 16 (if present) are blended into a substantially homogeneous mixture which fills most of the space between the anchor pin and inner wall of the borehole. The mixing action substantially cures the mixture to firmly secure the anchor pin within the borehole.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. A combination including a chemical anchoring adhesive and a wrapper, wherein the wrapper comprises an outer metallized polymer barrier layer and a polyolefin layer, the chemical anchoring adhesive is in a form selected from the group consisting of a rope, a slug, and a plurality of slugs, and the wrapper completely circumferentially surrounds the chemical anchoring adhesive, the chemical anchoring adhesive comprises a first part and a second part joined along an interface, each of the first and second parts having a viscosity of about 200,000–4,000,000 centipoise.

2. The combination of claim 1, wherein the metallized polymer layer comprises a metallized polyamide.

3. The combination of claim 1, wherein the polyolefin layer comprises a polymer selected from the group consisting of polyethylene homopolymers, ethylene-alpha olefin copolymers, and combinations thereof.

4. The combination of claim 1, wherein the polyolefin layer comprises linear low density polyethylene.

5. The combination of claim 4, wherein the wrapper consists of the metallized polymer layer and the polyolefin layer.

6. The combination of claim 1, wherein the wrapper further comprises a third, inner layer formed of a heat sealable polymer.

7. The combination of claim 1, wherein the chemical anchoring adhesive comprises one or more slugs and the wrapper comprises a tubular film around each slug.

8. The combination of claim 1, wherein the chemical anchoring adhesive comprises a rope and the wrapper comprises a tubular film around the rope.

9. The combination of claim 1, wherein the chemical anchoring adhesive comprises one or more slugs and the wrapper comprises a package containing the one or more slugs.

10. The combination of claim 9, wherein the package comprises a plurality of pouches, and each pouch contains a slug of chemical anchoring adhesive.

11. A combination including a chemical anchoring adhesive and a wrapper, wherein the wrapper comprises an outer metallized polyamide barrier layer having a thickness of about 2–30 microns and an inner heat seal layer having a thickness of about 3–30 microns, the chemical anchoring adhesive is in a form selected from the group consisting of a rope, a slug and a plurality of slugs, and the wrapper completelly circumferentially surrounds the chemical anchoring adhesive, the chemical anchoring adhesive comprises a first part and a second part joined along an interface, each of the first and second parts having a viscosity of about 200,000–4,000,000 centipoise.

12. The combination of claim 11, wherein the metallized polyamide layer comprises aluminum and nylon 6.

13. The combination of claim 11, wherein the inner heat seal layer comprises a polyolefin.

14. The combination of claim 13, wherein the polyolefin comprises linear low density polyethylene.

15. The combination of claim 14, wherein the wrapper consists of the outer layer and the inner layer.

16. The combination of claim 11, wherein the outer layer has a thickness of about 5–25 microns and the inner layer has a thickness of about 10–25 microns.

17. The combination of claim 11, wherein the outer layer has a thickness of about 10–20 microns and the inner layer has a thickness of about 14–20 microns.

18. A combination including a chemical anchoring adhesive and a tubular film wrapper, the wrapper comprising:

an outer metallized polyamide barrier layer; and an inner heat seal layer;

the tubular film having an internal diameter of about 5–50 mm and surrounding completely circumferentially the chemical anchoring adhesive, the chemical anchoring adhesive comprises a first part and a second part joined along an interface, each of the first and second parts having a viscosity of about 200,000–4,000,000 centipoise.

19. The combination of claim 18, wherein the internal diameter is about 10–25 mm.

20. The combination of claim 18, wherein the inner heat seal layer comprises linear low density polyethylene.

* * * * *